(12) United States Patent
Wang

(10) Patent No.: US 9,971,206 B2
(45) Date of Patent: May 15, 2018

(54) BENDABLE DISPLAY PANEL, MANUFACTURING METHOD THEREOF AND BENDABLE DISPLAY DEVICE

(71) Applicant: BOE TECHNOLOGY GROUP CO., LTD., Beijing (CN)

(72) Inventor: Xinxing Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 1 day.

(21) Appl. No.: 15/157,901

(22) Filed: May 18, 2016

(65) Prior Publication Data

US 2017/0059905 A1    Mar. 2, 2017

(30) Foreign Application Priority Data

Aug. 27, 2015  (CN) .......................... 2015 1 0537213

(51) Int. Cl.
| | | |
|---|---|---|
| *G02F 1/1339* | (2006.01) | |
| *G02F 1/1341* | (2006.01) | |
| *G02F 1/1333* | (2006.01) | |

(52) U.S. Cl.
CPC .......... *G02F 1/1339* (2013.01); *G02F 1/1341* (2013.01); *G02F 1/133305* (2013.01)

(58) Field of Classification Search
CPC .......................... G02F 1/133305; G02F 1/1339
See application file for complete search history.

(56) References Cited

U.S. PATENT DOCUMENTS

| | | | |
|---|---|---|---|
| 9,696,591 B2 | 7/2017 | Zhao et al. | |
| 2012/0154707 A1* | 6/2012 | Hsieh | .................. H01L 51/0097 |
| | | | 349/60 |
| 2015/0138103 A1 | 5/2015 | Nishi | |
| 2015/0362783 A1 | 12/2015 | Lv et al. | |
| 2016/0334663 A1 | 11/2016 | You et al. | |
| 2016/0341992 A1 | 11/2016 | Lee et al. | |
| 2017/0038619 A1 | 2/2017 | Fan et al. | |
| 2017/0102568 A1 | 4/2017 | Zhao et al. | |
| 2017/0194594 A1 | 7/2017 | Luo | |

FOREIGN PATENT DOCUMENTS

| | | |
|---|---|---|
| CN | 102902109 A | 1/2013 |
| CN | 104035241 A | 9/2014 |
| CN | 104111562 A | 10/2014 |
| CN | 104536173 A | 4/2015 |

(Continued)

OTHER PUBLICATIONS

Chinese Office Action in Chinese Application No. 201510537213.2, dated May 18, 2017 with English translation.

*Primary Examiner* — Wen-Ying P Chen
(74) *Attorney, Agent, or Firm* — Collard & Roe, P.C.

(57) ABSTRACT

A bendable display panel and a manufacturing method thereof and a bendable display device. The bendable display panel includes a first substrate, a second substrate, a sealant for sealing the first substrate and the second substrate, and a liquid crystal layer between the first substrate and the second substrate. A first sealant portion disposed along bendable edges of the bendable display panel has a Young's modulus smaller than that of a second sealant portion disposed along non-bendable edges of the bendable display panel. The sealant includes the first sealant portion and the second sealant portion.

16 Claims, 4 Drawing Sheets

(56) References Cited

FOREIGN PATENT DOCUMENTS

| | | |
|---|---|---|
| CN | 104570498 A | 4/2015 |
| CN | 104658990 A | 5/2015 |
| CN | 104730775 A | 6/2015 |
| CN | 104749828 A | 7/2015 |
| CN | 104777678 A | 7/2015 |
| JP | 2014-201027 A | 10/2014 |
| WO | 2013/183466 A2 | 12/2013 |

* cited by examiner

US 9,971,206 B2

BENDABLE DISPLAY PANEL, MANUFACTURING METHOD THEREOF AND BENDABLE DISPLAY DEVICE

CROSS REFERENCE TO RELATED APPLICATIONS

Applicant claims priority under 35 U.S.C. § 119 of Chinese Application No. 201510537213.2 filed on Aug. 27, 2015, the disclosure of which is incorporated by reference.

TECHNICAL FIELD

Embodiments of the present disclosure relate to a bendable display panel, a manufacturing method thereof, and a bendable display device.

BACKGROUND

Bendable display devices are display devices formed on the basis of bendable substrates. Since bendable display devices may be bent to a certain degree, they have a broad application prospect and market potential in fields such as TV.

Existing bendable display devices mainly include bendable display devices with an ADS (ADvanced Super Dimension Switch) mode and bendable display devices with a VA (Vertical Alignment) mode. For a bendable display device with the VA mode, dark-state liquid crystal molecules are vertical in the bending state, and there is no optical path difference for the liquid crystal layer. Therefore, light passing through the top and bottom glass substrates may return to its polarization original point and thus be absorbed by a top polarizer sheet. Therefore, no leakage occurs. However, for a bendable display device with the ADS mode, an optical path difference for the liquid crystal layer is caused by the strain generated by the top and bottom glass substrates in a bending state, which causes that some light cannot return to its polarization original point and may exit from the top polarizer sheet, thereby resulting in leakage.

SUMMARY

Embodiments of the present disclosure provide a bendable display panel, including: a first substrate, a second substrate, a sealant for sealing the first substrate and the second substrate and a liquid crystal layer between the first substrate and the second substrate. A first sealant portion disposed along bendable edges of the bendable display panel has a Young's modulus smaller than that of a second sealant portion disposed along non-bendable edges of the bendable display panel, and the sealant includes the first sealant portion and the second sealant portion.

Embodiments of the present disclosure also provide a manufacturing method of a bendable display panel, including: sealing a first substrate and a second substrate with a sealant and forming a liquid crystal layer between the first substrate and the second substrate, where a first sealant portion disposed along bendable edges of the bendable display panel has a Young's modulus smaller than that of a second sealant portion disposed along non-bendable edges of the bendable display panel, and the sealant includes the first sealant portion and the second sealant portion.

Embodiments of the present disclosure also provide a bendable display device, which includes the bendable display panel described herein.

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings.

DETAILED DESCRIPTION

Hereafter, the technical solutions of the embodiments of the present disclosure will be described in a clearly and fully understandable way in connection with the drawings related to the embodiments of the invention. It is obvious that the described embodiments are just a part but not all of the embodiments of the present disclosure. The drawings mentioned in the embodiments of the present disclosure are only to exemplarily illustrate the technical solutions of the present disclosure. The other drawings obtained from the drawings of the embodiments of the present disclosure through simple transformations should be within the scope of the present disclosure.

Figure 1:
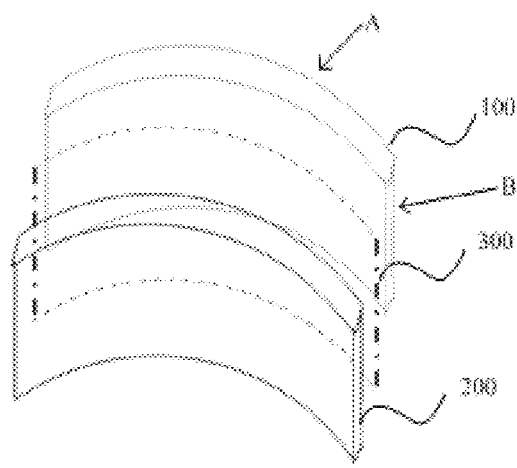
FIG. 1 is a structure diagram of a bendable display panel provided in an embodiment of the present disclosure.

Embodiments of the present disclosure provide a bendable display panel. For example, the display panel is of an ADS mode. Referring to FIG. 1, the display panel includes a first substrate 100, a second substrate 200, a sealant 300 for sealing the first substrate and the second substrate, and a liquid crystal layer sealed between the first substrate 100 and the second substrate 200 (not shown in the figure).

For example, a first sealant portion disposed along bendable edges of the bendable display panel has a Young's modulus smaller than that of a second sealant portion disposed along non-bendable edges of the bendable display panel. The sealant 300 includes the first sealant portion and the second sealant portion. The long edges (e.g., horizontal edges) shown in FIG. 1 are bendable edges, denoted as A; and the short edges (e.g., vertical edges) shown in FIG. 1 are non-bendable edges, denoted as B.

In embodiments of the present disclosure, since the first sealant portion disposed along the bendable edges has a smaller Young's modulus (that is, the first sealant portion for the bendable edges is a soft sealant), it is possible to reduce the force acting on the glass substrates when the bendable display panel is bent. Therefore, it is possible to reduce deformation of the glass substrates, to reduce the optical path difference resulted therefrom, and to reduce leakage in dark mode. On the other hand, the second sealant portion disposed along the non-bendable edges has a higher Young's modulus (that is, the second sealant portion for the non-bendable edges is a hard sealant), it is possible to effectively avoid separation of the first and second substrates.

For example, in FIG. 1, the first sealant portion disposed along the bendable edges of the bendable display panel may have a Young's modulus with an order of magnitude of $10^m$ Pa, while the second sealant portion disposed along the non-bendable edges of the bendable display panel may have a Young's modulus with an order of magnitude of $10^n$ Pa, where m+3 is smaller than or equal to n (e.g., m+3≤n), and both m and n are integers. This can further reduce the force acting on the glass substrates when the bendable display panel is bent, thereby reducing deformation of the glass substrates, reducing leakage, and meanwhile guaranteeing that the second sealant portion disposed along the non-bendable edges has a greater Young's modulus than that of the first sealant portion disposed along the bendable edges of the bendable display panel.

In some examples, m may have the value of 7, and n may have the value of 10. In this way, basically no leakage occurs at the periphery of the bendable display panel.

Figure 2:
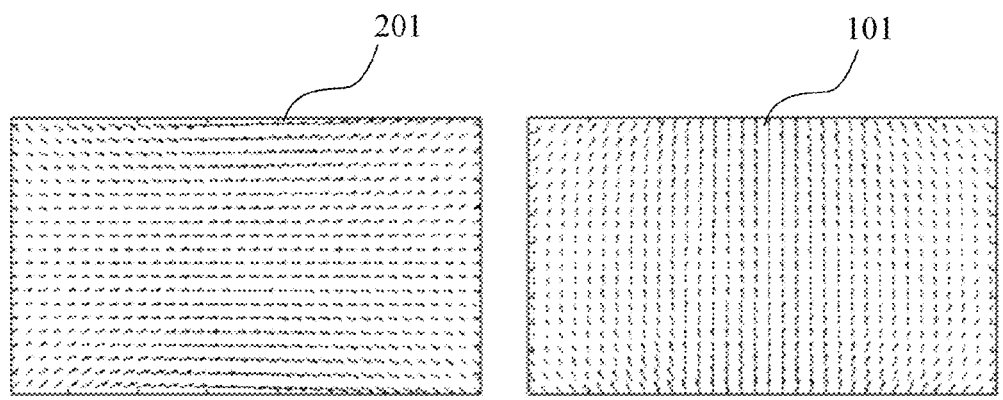
FIG. 2 is a diagram illustrating liquid crystal molecules in a bendable display panel of related technologies.

Referring to FIG. 2, diagrams showing optical axis distribution of liquid crystal molecules at a top substrate 101 and a bottom substrate 201 are shown respectively for a bendable ADS display panel in a bending state in related technologies. Since the sealant disposed along the non-bendable edges has a Young's modulus identical to that of the sealant disposed along the bendable edges (e.g., the identical Young's modulus being a relative large value), it is likely to result in a large deformation of the bendable edges of the glass substrates. In this case, it is likely to cause different optical axis orientations between liquid crystal molecules in an edge region and liquid crystal molecules in a center region. This may result in different optical paths between first light that passes through liquid crystal molecules in the edge region and second light that passes through liquid crystal molecules in the center region in dark mode, and may then cause that at least part of light from one of the first light and second light may not return to its polarization original point. The at least part of light may pass through the top polarizer sheet, resulting in leakage.

Figure 3:
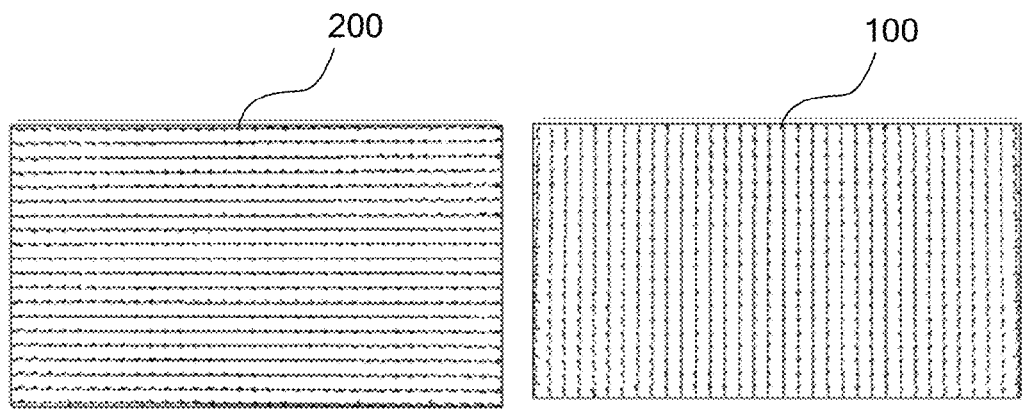
FIG. 3 is a diagram illustrating liquid crystal molecules in a bendable display panel provided in an embodiment of the present disclosure.

Referring to FIG. 3, diagrams illustrating optical axis distribution of liquid crystal molecules at the top substrate 100 and the bottom substrate 200 for the bendable display panel in a bending state provided in an embodiment of the present disclosure are shown. For the bendable display panel provided in the present disclosure, liquid crystal molecules have substantially consistent optical axis orientations. Therefore, the leakage phenomenon can be reduced as compared to the bendable display panel shown in FIG. 2.

Figure 4A:
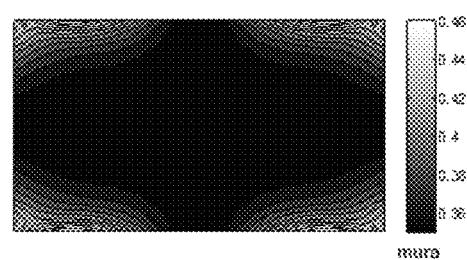
FIG. 4a is a leakage simulation diagram of a bendable display panel of related technologies.
Figure 4B:
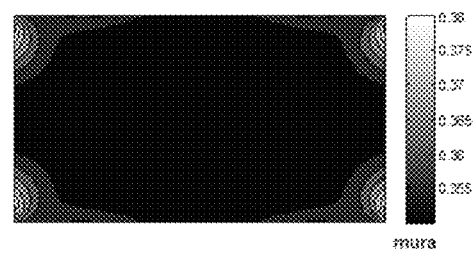
FIG. 4b is a leakage simulation diagram of a bendable display panel provided in an embodiment of the present disclosure.

FIG. 4a is a leakage simulation diagram of a bendable display panel of related technologies; and FIG. 4b is a leakage simulation diagram of a bendable display panel provided in an embodiment of the present disclosure. In FIGS. 4a and 4b, the leakage degree (mura) is quantified. By comparison between FIGS. 4a and 4b, it can be seen that the leakage of the bendable display panel provided in the embodiment of the present disclosure is reduced significantly.

In embodiments of the present disclosure, there are various ways to achieve that a first sealant portion disposed along bendable edges of the bendable display panel has a Young's modulus smaller than that of a second sealant portion disposed along non-bendable edges of the bendable display panel. For example, the first sealant portion disposed along the bendable edges of the bendable display panel may include a plasticizer. For example, the plasticizer is an o-benzoic acid ester compound or epoxy compound. The o-benzoic acid ester compound may be dicyclohexyl phthalate. The epoxy compound may be epoxidized soybean oil. The plasticizer (such as o-benzoic acid ester compound or epoxy compound) may have a mass percentage of 2.5%-3.5% (such as 3%) in the first sealant portion. Alternatively, the plasticizer may have a mass percentage of 2.5%-3.5% (such as 3%) in the entire sealant. In contrast, the second sealant portion disposed along the non-bendable edges of the bendable display panel does not include plasticizers. This implementation has benefits which include enabling respective bendable display panels to be manufactured by simple manufacturing processes.

An embodiment of the present disclosure further provides a manufacturing method of a bendable display panel, including:

sealing a first substrate and a second substrate with a sealant and forming a liquid crystal layer between the first substrate and the second substrate, where a first sealant portion disposed along bendable edges of the bendable display panel has a Young's modulus smaller than that of a second sealant portion disposed along non-bendable edges of the bendable display panel, and the sealant includes the first sealant portion and the second sealant portion.

For example, sealing the first substrate and the second substrate with the sealant and forming the liquid crystal layer between the first substrate and the second substrate includes: forming one or more plasticizers along bendable edges on the first substrate or the second substrate and then forming a sealing agent along the bendable edge and the non-bendable edge.

The manufacturing procedure of the bendable display panel provided in an embodiment of the present disclosure will be described in details below with reference to FIGS. 5-8.

Figure 5:
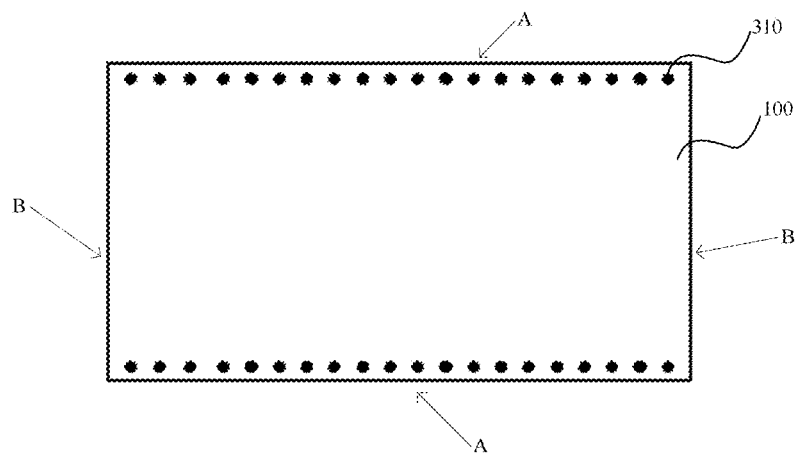
FIGS. 5-8 are flow diagrams of a manufacturing method of the bendable display panel shown in FIG. 1.

Referring to FIG. 5, step S1 includes providing a bendable first substrate 100 and forming a plurality of dot-like plasticizers 310 along two long edges A of the bendable first substrate 100. The plasticizers 310 may be an o-benzoic acid ester compound or an epoxy compound.

For example, the plasticizers may be formed along the long edges A by a glue dispensing or ink jet printing process. The total mass of dot-like plasticizer 310 may account for about 3% of the total mass of the entire sealant. Alternatively, the total mass of dot-like plasticizer 310 may account for about 3% of the total mass of the first sealant portion 3001. In some embodiments, the size and density of dot-like plasticizers 310 may be configured according to design requirements. For example, the dot-like plasticizers 310 are configured such that the total mass of dot-like plasticizers 310 may account for about 3% of the total mass of the entire sealant.

Figure 6:
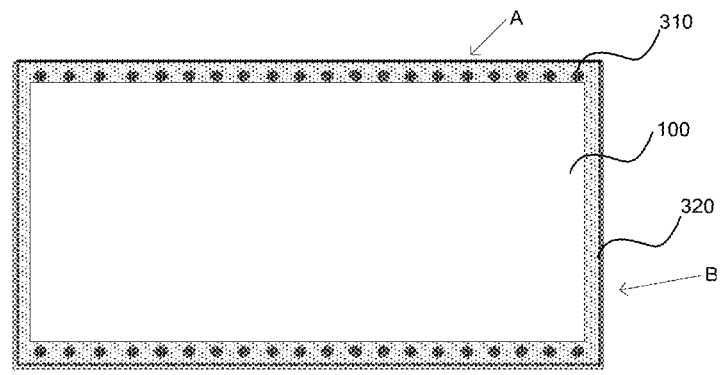
Figure 7:
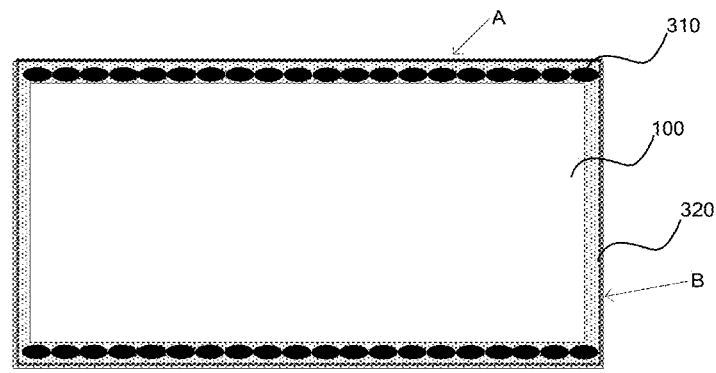

Referring to FIG. 6, step S2 includes coating a sealing agent 320 on both two bendable long edges A and two non-bendable short edges B of the first substrate 100. For example, the sealing agent 320 may be acrylate or another similar compound.

For example, the sealing agent 320 may have a width larger than the diameter of the dot-like plasticizers 310 such that the sealing agent 320 may surround the dot-like plasticizers 310, thereby allowing the dot-like plasticizers 310 to be better mixed into the sealing agent 320. The coating described in the embodiment of the present disclosure may be implemented by a screen printing process or spray coating process.

Step S3 includes mixing the plasticizers 310 and the sealing agent 320. The mixing process may enable the plasticizers 310 to be distributed more evenly into the sealing agent 320. A structure after step S3 may be referred to in FIG. 7.

Step S4 includes assembling the second substrate 200 and the first substrate 100.

Figure 8:
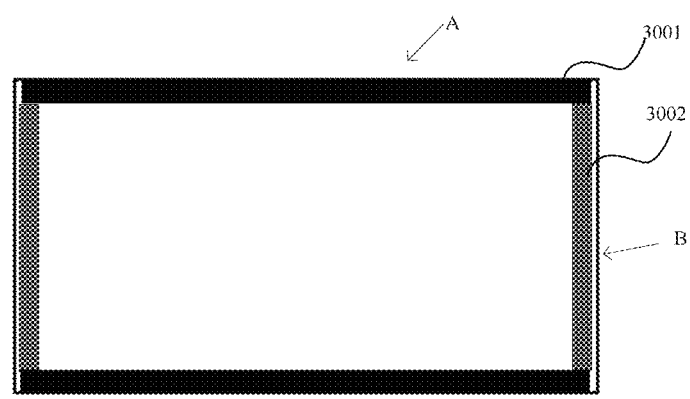

Step S5 includes performing a mixing heat treatment on the plasticizers 310 and the sealing agent 320 such that the plasticizers 310 and the sealing agent 320 are cured to form the above-mentioned sealant 300. The sealant 300 includes a first sealant portion 3001 at two long edges A and a second sealant portion 3002 at two short edges B. The first sealant portion 3001 at the long edges A includes plasticizers and has a Young's modulus smaller than that of the second sealant portion 3002 at the short edges B. Referring to FIG. 8, a result from curing the plasticizers 310 and the sealing agent 320 is shown.

The curing process in step S5 may be implemented by baking. The baking temperature may be consistent with the baking temperature for the sealing agent 320 (e.g., between 100° C.-200° C.). Therefore, no additional process is needed. And in the manufacturing method of the bendable display panel provided in the embodiments of the present disclosure, the plasticizers 310 may also be manufactured by the same process as the sealing agent 320, (e.g., a glue dispensing or ink jet printing process), and no extra process and equipment are needed. Accordingly, manufacturing difficulty of the display panel is reduced.

It is to be noted that in embodiments of the present disclosure, the sealant 300 may be manufactured on the first substrate 100 or the second substrate 200. For example, the sealant 300 may be manufactured on the second substrate 200 by performing operations similar to steps S1, S2, S3, S4 and S5.

Based on the same or similar concept, an embodiment of the present disclosure further provides a bendable display device that may include the above-described bendable display panel.

For example, the bendable display device may be a TV set or another product or component with a display function.

It should be noted that, in the drawings, the size of a layer or an area may be exaggerated for clarity of the drawings. Besides, it is understandable that if an element or a layer is said to be "under" another element or layer, it can be directly under the other element or an intermediate layer may exist therebetween. Besides, it is understandable that if a layer or an element is said to be "between" two layers or "between" two elements, it can be the only one layer or element between the two layers or two elements, or one or more intermediate layer or element can exist. Similar reference marks in the full text refer to the similar elements.

In the present disclosure, the terms "first," "second," "third", etc. are not intended to indicate or imply any importance, but merely used for description purposes. The term "plurality" refers to two or more than two, unless otherwise defined.

The foregoing are merely specific embodiments of the invention, but not limitative to the protection scope of the invention. One skilled in the art could devise variations or replacements that within the scope and the spirit of the present invention, those variations or replacements shall belong to the protection scope of the invention. Thus, the protection scope of the invention shall be defined by the accompanying claims.

The present disclosure claims the benefits of Chinese patent application No. 201510537213.2, which was filed with the China's State Intellectual Property Office on Aug. 27, 2015 and is incorporated herein in its entirety by reference as part of this application.

What is claimed is:

1. A bendable display panel, comprising:
a first substrate, a second substrate, a sealant for sealing the first substrate and the second substrate and a liquid crystal layer between the first substrate and the second substrate;
wherein a first sealant portion disposed along bendable edges of the bendable display panel has a Young's modulus smaller than that of a second sealant portion disposed along non-bendable edges of the bendable display panel, and the sealant comprises the first sealant portion and the second sealant portion;
wherein the first sealant portion includes one or more plasticizers, and the second sealant portion does not include plasticizers.

2. The bendable display panel of claim 1, wherein the first sealant portion has a Young's modulus with an order of magnitude of $10^m$ Pa, the second sealant portion has a Young's modulus with an order of magnitude of $10^n$ Pa, m+3 is smaller than or equal to n, and both m and n are positive integers.

3. The bendable display panel of claim 2, wherein m has a value of 7, and n has a value of 10.

4. The bendable display panel of claim 1, wherein the one or more plasticizers are an o-benzoic acid ester compound or an epoxy compound.

5. The bendable display panel of claim 4, wherein:
the one or more plasticizers are dicyclohexyl phthalate or epoxidized soybean oil.

6. The bendable display panel of claim 1, wherein:
in the first sealant portion disposed along the bendable edges, the one or more plasticizers have a mass percentage of 2.5%-3.5%.

7. A bendable display device comprising the bendable display panel of claim 1.

8. The bendable display panel of claim 1, wherein:
the one or more plasticizers account for a mass percentage of 2.5%-3.5% of the sealant.

9. A manufacturing method of a bendable display panel, comprising:
sealing a first substrate and a second substrate with a sealant;
forming a liquid crystal layer between the first substrate and the second substrate;
wherein a first sealant portion disposed along bendable edges of the bendable display panel has a Young's modulus smaller than that of a second sealant portion disposed along non-bendable edges of the bendable display panel, and the sealant comprises the first sealant portion and the second sealant portion;
wherein the first sealant portion includes one or more plasticizers, and the second sealant portion does not include plasticizers.

10. The method of claim 8, wherein sealing the first substrate and the second substrate with the sealant comprises:
forming one or more plasticizers along the bendable edges on the first substrate or the second substrate;
forming a sealing agent along the bendable edges and the non-bendable edges.

11. The method of claim 10, wherein forming the one or more plasticizers along the bendable edges on the first substrate or the second substrate comprises forming the one or more plasticizers along the bendable edges by an ink jet printing process.

12. The method of claim 9, wherein a Young's modulus of the first sealant portion has an order of magnitude of $10^m$ Pa, a Young's modulus of the second sealant portion has an order of magnitude of $10^n$ Pa, m+3 is smaller than or equal to n, and both m and n are positive integers.

13. The method of claim 12, wherein m has a value of 7, and n has a value of 10.

14. The method of claim 9, wherein the first sealant portion includes one or more plasticizers, and the second sealant portion does not include plasticizers.

15. The method of claim 14, wherein the one or more plasticizers are an o-benzoic acid ester compound or an epoxy compound.

16. The method of claim 15, wherein:
   the one or more plasticizers are dicyclohexyl phthalate or epoxidized soybean oil.

* * * * *